Oct. 11, 1938.　　F. T. LIND ET AL　　2,132,825
PIVOT JOINT
Filed July 18, 1936
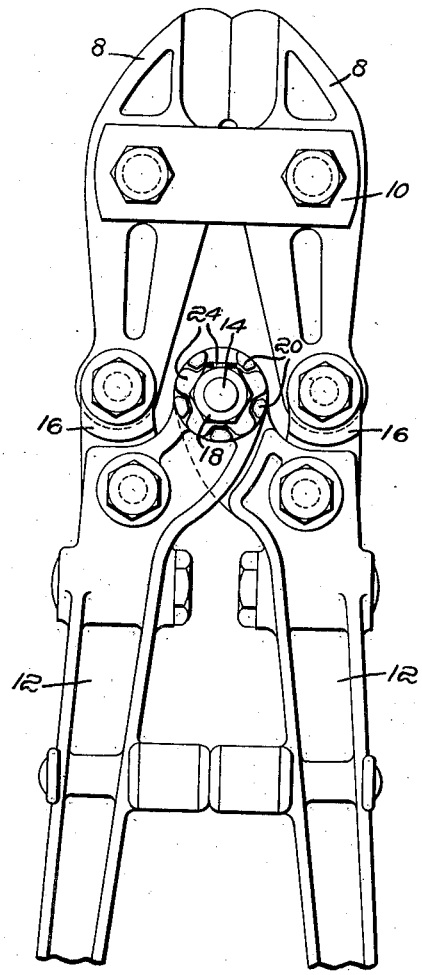
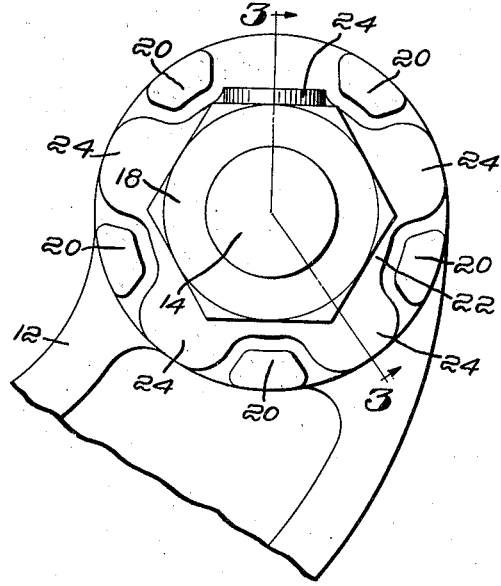
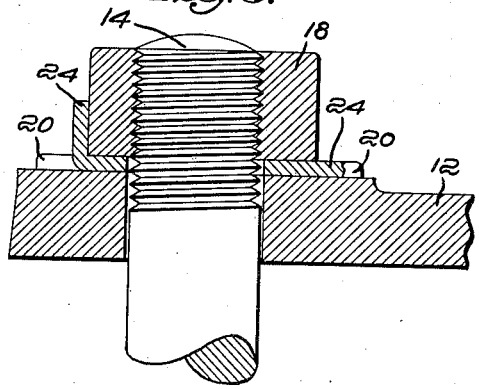
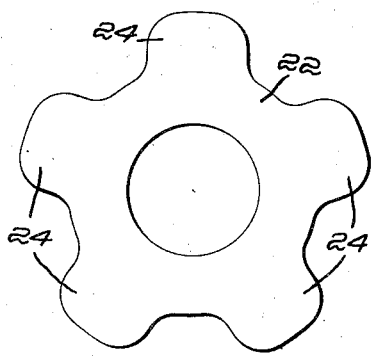
Inventors:
Francis T. Lind,
Edwin M. Webster, Patented Oct. 11, 1938

2,132,825

UNITED STATES PATENT OFFICE 2,132,825

PIVOT JOINT

Francis T. Lind, Everett, and Edwin M. Webster, Malden, Mass., assignors to H. K. Porter, Inc., Everett, Mass., a corporation of Massachusetts Application July 18, 1936, Serial No. 91,344

7 Claims. (Cl. 151—49)

This invention relates to pivot joints such as are found, for example, in hand tools wherein cooperating relatively pivoted parts are secured together by a threaded pivot pin, stud or bolt, and the object is to provide an improved construction obviating backing off of the threaded connection with consequent loosening of the joint. Our invention will be well understood by reference to the following description of an illustrative embodiment thereof shown by way of example in the accompanying drawing, wherein:—

Fig. 1 is a side elevation of a compound lever cutting tool embodying a joint illustrating my invention;

Fig. 2 is an enlarged detail thereof;

Fig. 3 is a section on the line 3—3 of Fig. 2; and

Fig. 4 is a plan view of one of the elements.

As an illustration of the application of the invention to a hand tool we have illustrated in Fig. 1 a bolt clipper of the general type shown in the patent to Porter 484,670, Oct. 18, 1892, and embodying a pair of jaw levers 8 pivoted between straps or side plates 10 and operated by handle levers 12 pivoted together on pivot bolt 14 and here shown as connected to the tails of the jaw levers by "adjusting sections" 16 of the kind shown in the patent to Porter 1,822,745, Sept. 8, 1931. Herein the connection at 14 is illustrative of the invention, which, however, might be incorporated in any of the pivotal joints of the construction. The pivot 14 is herein shown as taking the form of a bolt which might have a fixed head on the further side and is here shown as provided with a movable head or nut 18 on the nearer side. Both heads may be locked to the adjacent faces of the levers beneath them in the manner about to be described.

Referring now more particularly to Figs. 2 and 3, in the particular form of the invention shown the face of the lever around the bolt hole and remote therefrom is provided with regularly spaced projections 20 defining between them radial channels, five such channels being here shown. A washer shown separately in Fig. 4 is provided with an annular portion 22 adapted to underlie the head or nut and bendable radiating arms 24 adapted to be received in the channels. Assuming the washer to be placed in position with the arms resting in the various channels, the threaded connection may be set up and when tight one of the arms which extends perpendicularly to an adjacent flat of the head may be bent upwardly to lie against the flat, as shown at the upper portion of Fig. 2 and at the left in Fig. 3. The head or nut 18 is thus locked to the washer which is held against movement by the immovable engagement of the other arms between the projections 20. Loosening of the threaded connection by rotation of the locked head 18 relative to the cooperating threaded part is thus positively prevented.

In the preferred form of the invention shown the channels between the projections 20 have positions corresponding to the sides of a regular polygon (herein a pentagon), the number of sides of which is different from and not a sub-multiple of the number of the sides of the head (herein six). The initial position of the arms 24 of the washer corresponds to one of said sets of sides, herein the sides of the pentagon. The arms of the washer are initially mated in engagement with the homologous set of sides and free turning between the bolt head and the side of the lever is permitted. Thus in the example illustrated the washer is initially flat, has five arms corresponding to the channels between the projections 20 which lie within these channels permitting the head 18 to be turned freely on the annular body 22 of the washer. The choice of the number of sides as described gives a differential or hunting action providing for a fine adjustment. Given as shown a hexagonal head and a washer with pentagonally arranged arms, it is clear that if the head were turned clockwise, viewing Fig. 2, 12° from the position shown, the tongue exposed at the right of that one which is shown turned up in the figure would then be perpendicular to the adjacent flat of the head and would be turned up to lock the same rather than the one shown. Where all the arms of the pentagon are present, an increment of adjustment is provided for at every 12° of revolution. If the number of locking channels and arms were the same as or a sub-multiple of the number of sides of the head, the increments of adjustment in turn would be no greater than the latter number. Five channels as shown is a desirable choice as it permits a rugged construction in the washer and provides for a 12° increment on a hexagonal head and an 18° increment on a square head.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. In a pivot joint, in combination, a pivoted member having a pivot hole and outwardly therefrom a plurality of radial channels, a washer having arms to fit the channels, a threaded pivot pin in the hole having a prismatic head resting on the washer, the arms being bendable to dispose one of the same against a side of the head.

2. In a pivot joint, in combination, a pivoted member having a pivot hole and outwardly therefrom a plurality of radial channels, a washer having arms to fit the channels, a threaded pivot pin in the hole having a prismatic head resting on the washer, the arms being bendable to dispose one of the same against a side of the head, the arms being located in positions corresponding to sides of a polygon, the number of sides of which is other than the same as or a sub-multiple of the number of sides of the head.

3. In a pivot joint, in combination, a pivoted member having a pivot hole and outwardly therefrom a plurality of radial channels, a washer having arms to fit the channels, a threaded pivot pin in the hole having a head resting on the washer, the arms being bendable upwardly and the head being shaped to interlock with an arm so bent up.

4. In a pivot joint in combination with a pivoted member having a pivot hole and remote therefrom a radial channel, a washer, a threaded pivot pin in the hole having a prismatic head resting on the washer, the washer having an arm received in the channel and a plurality of arms adapted selectively to be bent up to engage a side of the head, the latter arms corresponding to sides of a polygon, the number of sides of which is other than the same as or a sub-multiple of the number of sides of the head.

5. In a pivot joint in combination with a pivoted member having a pivot hole and remote therefrom a plurality of radial channels, a washer, a threaded pivot pin in the hole having a prismatic head resting on the washer, the washer having arms fitting the channels and an arm bent up to engage a side of the head, the former arms corresponding to sides of a polygon, the number of sides of which is other than the same as or a sub-multiple of the number of sides of the head.

6. In a pivot joint in combination with a pivoted member having a pivot hole and outwardly therefrom radial channels, a threaded pivot pin in the hole having a prismatic head, a washer having a central annular portion underlying the head and a plurality of arms radiating therefrom, each individually bendable across its base independently of the others and therefore each capable of lying either substantially in the plane of said annular portion or substantially at right angles thereto, an arm in the former position being received in the channel and in the latter lying against a side of the head.

7. In a pivot joint in combination with a pivoted member having a pivot hole and outwardly therefrom radial channels, a threaded pivot pin in the hole having a prismatic head, a washer having a central annular portion underlying the head and a plurality of arms radiating therefrom, each individually bendable across its base independently of the others and therefore each capable of lying either substantially in the plane of said annular portion or substantially at right angles thereto, an arm in the former position being received in the channel and in the latter lying against a side of the head, the channels being located in positions corresponding to sides of a polygon, the number of sides of which is other than the same as or a sub-multiple of the number of sides of the head and the arms in positions homologous to sides of one of said sets of sides.

FRANCIS T. LIND.
EDWIN M. WEBSTER.